(12) United States Patent
Mao et al.

(10) Patent No.: US 11,556,256 B2
(45) Date of Patent: Jan. 17, 2023

(54) FRAGMENTATION MEASUREMENT SOLUTION

(71) Applicant: Oracle International Corporation, Redwood Shores, CA (US)

(72) Inventors: Tao Mao, Castro Valley, CA (US); Yanfei Fan, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 89 days.

(21) Appl. No.: 17/231,934

(22) Filed: Apr. 15, 2021

(65) Prior Publication Data

US 2022/0334739 A1    Oct. 20, 2022

(51) Int. Cl.
*G06F 12/00* (2006.01)
*G06F 3/06* (2006.01)

(52) U.S. Cl.
CPC ............ *G06F 3/0631* (2013.01); *G06F 3/064* (2013.01); *G06F 3/067* (2013.01); *G06F 3/0619* (2013.01); *G06F 3/0659* (2013.01)

(58) Field of Classification Search
CPC ...... G06F 3/0631; G06F 3/0619; G06F 3/064; G06F 3/0659; G06F 3/067

USPC .......................................................... 711/154
See application file for complete search history.

(56) References Cited

U.S. PATENT DOCUMENTS

| | | | |
|---|---|---|---|
| 6,571,261 B1 * | 5/2003 | Wang-Knop | G06F 16/1724 |
| 10,417,121 B1 * | 9/2019 | Suhas | G06F 12/02 |
| 10,853,257 B1 * | 12/2020 | Yu | G06F 3/0649 |
| 2008/0244210 A1 * | 10/2008 | Vingralek | G06F 3/0674 711/170 |
| 2017/0206135 A1 * | 7/2017 | Zeng | G06F 11/1076 |

* cited by examiner

*Primary Examiner* — Mardochee Chery
(74) *Attorney, Agent, or Firm* — Trellis IP Law Group, PC; Lisa Benado

(57) ABSTRACT

A degree of fragmentation is determined based on a number of holes present in a storage system layout or a portion of a layout. Edges between the holes and used portions of the storage system are tabulated by scanning a storage space. The occurrences of a pattern of used/available allocation units and/or the occurrences of another pattern available/used allocation units are recognized. A fragmentation value is calculated based on occurrences of the patterns in view of the total storage space. The present fragmentation measurement system utilizes the number of occurrences of the holes in assessing fragmentation.

20 Claims, 11 Drawing Sheets

FRAGMENTATION MEASUREMENT SOLUTION

BACKGROUND

In computing systems, data is stored for later access in various types of storage systems. Storage management is critical for efficient allocation of portions of storage systems, referred to as, "allocation units," and for proper system operations. When storage space is used inefficiently, computing capacity and/or performance is reduced.

The task of fulfilling an allocation request consists of locating unused allocation units of sufficient size. At any given time, some allocation units are in use and unavailable for current storage, while some allocation units are "free" (unused) and thus available for allocations. Continuous regions of storage may become fragmented, forming smaller contiguous areas and reducing large free chunks of storage that may be needed to store particular data, such as a computer program.

Fragmentation of a storage system can occur as data objects are created and destroyed. For example, if a data object that is stored between two other stored data objects, is deleted, a "hole" is created. Fragmentation can be a problem in both physical and virtual storage solutions. For example, with virtual memory, large data allocations may be required to be contiguous in virtual address space, rather than physical address space. Assessment of the fragmentation of a storage system facilitates use of remedies, such as defragmentation, to be made for various storage applications.

SUMMARY

The present fragmentation measurement techniques facilitate storage management by enabling storage systems to be assessed for degrees of fragmentation. The present fragmentation measurement system utilizes the number of occurrences of holes (available space) to calculate fragmentation. To assess fragmentation, edges between these holes and used portions of the storage system are tabulated by scanning a storage space, or data structures representing the storage space. The occurrences of a pattern of used/available allocation units and/or the occurrences of another pattern of available/used allocation units are recognized. A fragmentation value is calculated based on occurrences of the patterns in view of the total storage space.

A computer-implemented method is described to assess a degree of fragmentation of a storage system by providing an allocation unit layout that includes used allocation units and available allocation units. The method incorporates a determination of at least one of: (1) a first value representing occurrences of a first pattern of at least a portion of the allocation unit layout or (2) a second value representing occurrences of a second pattern of at least a portion of the allocation unit layout. In the direction of scanning the allocation unit layout, the first pattern includes a used allocation unit followed by an available allocation unit. The second pattern includes an available allocation unit followed by a used allocation unit in the direction of the scan. The method further includes determining a fragmentation value representing occurrences of holes of the allocation unit layout based on at least one of the first or second values and also a third value representing a total of allocation units of at least a portion of the allocation unit layout.

In some implementations, the fragmentation value may be determined by a first Equation in which the first and second values are added and dividing by the third value. The first Equation may also be applied to information representing the allocation unit layout stored in a bitmap structure in which the bitmap structure is scanned to detect the patterns. Furthermore, at times regions of the allocation unit layout may be identified and the first and second values may be patterns within at least one of the regions and the third value represents a total of allocation units of the region(s).

The present method may further be applied to identified regions of the allocation unit layout, in which the first value (v1) represents the first pattern of at least one of the regions, the second value (v2) represents the second pattern of the at least one of the regions, and the third value (v3) represents a total of allocation units of the at least one of the regions. In some instances, the method may be applied to identified samples of the allocation unit layout, in which (v1) represents the first pattern of the sample and (v2) represents the second pattern of the sample. For sampling implementations of the method, the third value (v3) may be calculated by determining a fourth value (v4) that represents occurrences of a fourth pattern of sample and a fifth value (v5) that represents occurrences a fifth pattern of the sample. In these cases, the fourth pattern (v4) includes at least two adjacent used allocation units and the fifth pattern (v5) includes at least two adjacent available allocation units. Further to the sampling implantation, the fragmentation value (f) may be calculated by applying a second Equation that involves a hole summation value by adding (v1) and (v2) and this hole summation value is divided by a total that includes summation of (v4) and (v5) added to the hole summation value.

In some implementations, a linked list structure that includes stored information representing the allocation unit layout, may be used in determining the fragmentation value (f) according to a third Equation (Equation 1b). The third Equation includes multiplying (v2) and (v3) (as calculated above for the first Equation) by 2. Variations of this third Equation may be used as a fourth Equation in which (v3) is equivalent to a sixth value (v6) representing a total of allocation units of the linked list structure.

The method in which the fragmentation value (f) is determined, may be used in various in at least one storage application or memory application including: file systems, memory management, cloud block storage defragmentation, cache mechanisms, or email compaction.

The methods described herein may also be implemented in an apparatus having one or more processors and logic encoded in one or more non-transitory media for execution by the one or more processors and when executed is operable to perform the methods as described.

Furthermore, the methods as describe above may be implemented by a non-transitory computer-readable storage medium carrying program instructions to assess a degree of fragmentation of a storage system, and for execution by the one or more processors and when executed is operable to perform the methods as described.

A further understanding of the nature and the advantages of particular embodiments disclosed herein may be realized by reference of the remaining portions of the specification and the attached drawings.

BRIEF DESCRIPTION OF THE DRAWINGS

The disclosure is illustrated by way of example, and not by way of limitation in the figures in which like reference numerals are used to refer to similar elements.

DETAILED DESCRIPTION OF EMBODIMENTS

Figure 1:
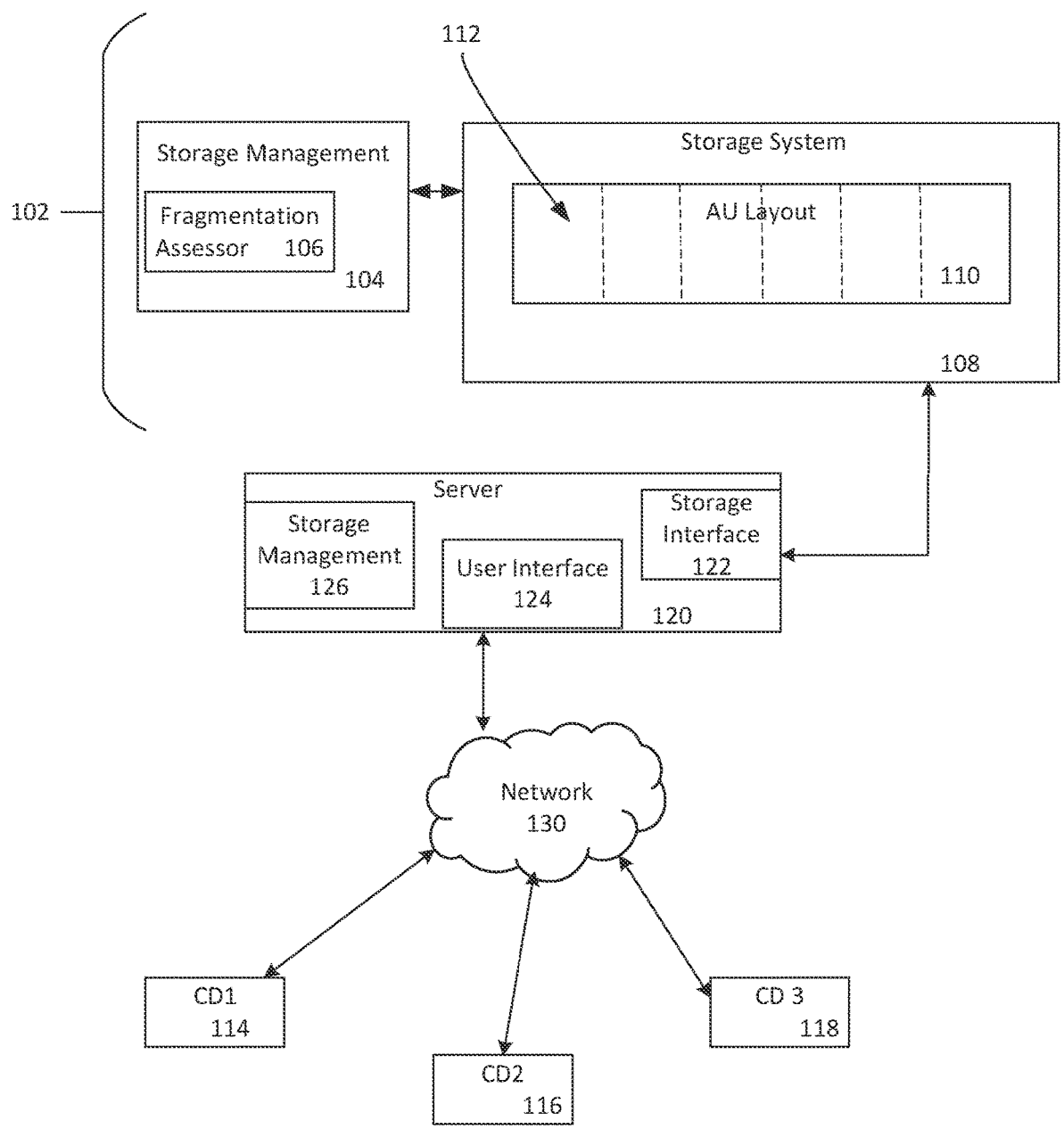
FIG. 1 is a block diagram of an example of a networking storage environment that employs a storage management system, in accordance with some implementations.

The present fragmentation measurement system enables assessment of fragmentation present in storage systems. A degree of fragmentation is determined based on a number of holes present in a storage system layout or a portion of a layout. The term, "hole" as used in this description refers to a continuous available storage space including one or more allocation units. The edges between the holes and used portions of the storage system are tabulated by scanning storage space. The occurrences of a pattern of used/available allocation units and/or the occurrences of another pattern of available/used allocation units are recognized. A fragmentation value is calculated based on occurrences of the patterns in view of the total storage space. Rather than measuring the length of each of the holes, the present fragmentation measurement system utilizes the number of occurrences of the holes in assessing fragmentation. For example, an unfragmented layout may be considered to include a single hole.

For purposes of this description a "storage system" refers to a physical (e.g., in-device) or logical (also referred to as "virtual") memory or storage. An allocation unit layout of the storage system may be divided into allocation units, which encompass areas for storage. Each allocation unit has a status of being used or available at any given time. An allocation unit (AU) as provided by this description is the smallest allocation size in a storage system which includes memory and/or storage (both logical and physical). Groups of allocation units in a storage system may be organized into "regions" or "local regions." "Allocation units" may also be referred to as "disks" and "regions" may also be referred to as "disk groups" for a clustered storage pool, such as for database file management applications.

For illustration purposes, this description provides the expression "1" to denote a used allocation unit and "0" to denote an available allocation unit. In an allocation unit layout, the expression "10" is provided to denote a first pattern that includes a used allocation unit followed by an available allocation unit when scanning the allocation unit, for example, from left to right. Although, scanning from right to left is also possible. The expression "01" is provided to denote a second pattern that includes an available allocation unit followed by a used allocation unit when scanning the allocation unit, for example, from left to right. In addition, "11" is provided to denote a fourth pattern that includes at least two consecutive used allocation units and "00" is provided to denote a fifth pattern that includes at least two consecutive available allocation units in the allocation unit layout.

The fragmentation measurement process may include scanning through the AU layout to obtain the number of 01 and/or 10 patterns. However, various other expressions may be possible to indicate used and available allocation units. For example, in some implementations, "0" may represent a used allocation unit and "1" may represent an available allocation unit. Still other symbols may be employed to denote used allocation units, available allocations units, and allocation unit patterns, and the full scope of this description is applicable to such other symbols.

A fragmentation value determined by the present fragmentation assessment system may be presented in terms of a number from zero to one, a percentage, fraction, decimal, symbol, word, (e.g., high, medium, low), or color to indicate a degree of fragmentation, or other manner of denoting the value. Typically, when a number representation of the value is used, a larger fragmentation value indicates a greater degree of fragmentation.

In some implementations, a threshold fragmentation value, e.g., a fragmentation value meeting a threshold amount, is used to trigger a fragmentation correction procedure. In some implementations, a threshold may also be used in ranking various storage spaces, for example in which storage spaces or portions of a storage space, above a threshold amount are ranked according to the respective determined amount of fragmentation. The threshold amount may be a number, a number range, a particular symbol, word, or color, etc. Designation of a threshold may be specific to a fragmentation correction procedure or other application of the fragmentation measurement system, such as a threshold of 50% representing that half of a storage space is fragmented.

The calculated value representing the degree of fragmentation may be used for various storage system processes, such as to determine when to initiate a fragmentation correction procedure, identify where in the storage system to perform the correction, and/or to evaluate the success of a fragmentation correction procedure. Some specific applications may include file system management, such as database file management, memory management, cache memory management, program code storage, e.g., java and python software languages, to determine a point for memory compaction, cloud block storage management, management to measure fragmentation between when to compact, when to perform email compaction and which email folders to compact, to check whether fragmentation correction procedures were successful, etc. Other applications may also make use of the calculated fragmentation value as determined by the present fragmentation measurement system.

Unlike the present fragmentation measurement system, some other systems may use rudimentary calculations to determine each available allocation unit over total size of the storage system. For example, some other systems may determine available storage spaces in small contiguous chunks, e.g., less than 256 KB, and may calculate fragmentation in terms of such available small contiguous chunks relative to a total storage system being evaluated. However, such calculations may not accurately evaluate the fragmentation condition of a storage system. To illustrate drawbacks of such small available space methods, instances in which allocation unit layouts include the same available space, but have different fragmentation may not be accurately discriminated. The following examples are provided, in which both layout (a) and layout (b) both have 10 available allocation units. However, layout (b) has larger available spaces and less fragmentation.

(a) 1100100110010000
(b) 1110000011100000.

By contrast, the present fragmentation measurement system accurately identifies (b) as less fragmented than (a) by accounting for occurrences of holes (or continuous available chunks) rather than tabulating each available allocation unit. In general, the fewer occurrences of holes in view of the total layout, the less fragmented the system, as compared to a same sized layout having more holes.

In various implementations, the present fragmentation measurement system enables more precise evaluation of fragmentation than other prior systems. With the use of the present methods of evaluation, procedures may be employed to solve for fragmentation issues, e.g., via defragmentation procedures, so that correction procedures may be run in a more efficient manner. Such fragmentation correction procedures may be resource and time intensive. For example, defragmenting storage on a regular or random basis can consume unnecessary computing resources and limit the storage system availability during defragmentation. It is also beneficial to run correction procedures, such as garbage compaction, before there are no viable storage regions available which would result in delay the availability of the storage system while fragmentation issues are corrected. Rather, with the present fragmentation measurement system, fragmentation solutions may be executed on the fly when it is determined to be needed.

The present fragmentation measurement system may further enable selecting of target portions of storage to be repaired, rather than addressing fragmentation of an entire storage system. In some implementations, only the select portions of storage that have a fragmentation value greater than a threshold may be repaired or prioritized over other storage portions.

In a use case for illustration purposes, a 10 GB memory may be divided into defined equal 1024 regions. Allocation of data is made to available regions of the memory to start filling these unused regions. If, for example, 700 regions are used in memory allocation for a storage of data of an application program, some of the 700 regions may not be needed any longer for the data previously stored in these "dead" regions. It is undesirable to pick all 700 regions to do garbage collection, as it would take too much time. The present fragmentation measurement system enables particular local region to be selected for garbage collection to reclaim memory when the memory is determined to no longer be in use. A determined degree of fragmentation for particular sized regions may be considered to cherry pick a number of regions, for example 100 regions, with the highest degree of fragmentation for incremental compaction. For example, selection may be based on regions with a fragmentation value over a threshold, a top predetermined number of regions, a top percentage of regions, and the like. Each time garbage collection is performed, some region or subgroup of regions, is picked according to the current degree of fragmentation and then, the next time another region or subgroup of regions may be picked from remaining regions, for example, having the next uppermost degree of fragmentation.

In illustration, FIG. 1 shows a usage example of a network computing environment 100, such as a cloud network, in which the fragmentation measurement system 102 may be implemented. The fragmentation measurement system 102 includes a storage management module 104 with a fragmentation assessment module 106, and a storage system 108 having an allocation unit layout 110. One or more client devices 114, 116, 118 of a user of the fragmentation measurement system 102 are included in the network computing environment 100. For simplicity, three client devices 114, 116, 118 are shown in FIG. 1. The fragmentation measurement system 102 offers the ability to serve one or two client devices, or to scale to concurrently serve many client devices.

The allocation unit layout 110 of the storage system 108 includes a plurality of allocation units 112 to hold data. The storage system may be, for example but not limited to, an electronic, magnetic, optical, electromagnetic, infrared, or semiconductor system, apparatus, device, or any suitable combination of the foregoing. More specific examples of the storage system may include the following: a group of disks, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. The storage system may include a computer-usable or computer-readable medium upon which a program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device. Other types of storage systems are possible having allocation units in which fragmentation may occur.

The present fragmentation measurement system 102 may be employed with physical and/or logical storage. Although the allocation unit 112 is shown as a physical component of the storage system 108, the allocation unit 112 may also be a logical address defined by the central processing unit (CPU).

Server 120 includes a storage interface module 122 configured to send data and process signals to storage system 108 and to receive and process data signals and data received from storage system 108. Server 120 also includes a user interface module 124 adapted to receive and process data from a client device via user input associated with data for storage. For example, server may receive data from one or more client devices 114, 116, 118 through user interface 124 with instructions to store the data. The storage management module 126 of the server 120 may assign allocation units for storage of the data. Server may also receive requests from the client devices 114, 116, 118 to retrieve data stored in storage system 108. The storage management module 126 may obtain the data from the storage system via storage interface 122 and transmit it to the client devices 114, 116, 118 via user interface 124.

Communication among the components of the network 130 may be through one or more network 130. Storage system 108 may be connected to the server 120 directly or indirectly, for example via connections to a network 130. In some implementations, storage system 108 may be a component of server 120. The network 130 may include one or more WANs (Wide-Area Networks) and/or LANs (Local-Area Networks), which may be wired and/or wireless. In some examples, the network 130 may include the Internet and/or one or more cellular networks, among other networks. In still some implementations, client devices 114, 116, 118, server 120, and/or storage system 108 (and/or other components including storage management 104) may be physically coupled to any other components of the networking environment 100 to exchange information. Although the network 130 is shown as a single network, it should be understood that the network 130 may include multiple, distinct networks that are themselves communicatively linked. The network 130 could take other forms as well.

The network 130 may operate according to one or more communication protocols, such as Bluetooth™, LTE (Long-Term Evolution), CDMA (Code Division Multiple Access), WiMax (Worldwide Interoperability for Microwave Access), WiFi (Wireless Fidelity), WiFi Direct (Wireless Fidelity Direct), EDGE (Enhanced Data rates for GSM (Global System Mobile) Evolution), 3G (Third Generation), 4G (Fourth Generation), HTTP (Hyper-Text Transfer Protocol), TCP (Transmission Control Protocol), SIP (Session Initiation Protocol), device contact based transfer protocols, device movement based pairing protocols, and other communication protocols.

In some implementations, the network computing environment 100 may be an enterprise computing environment including a collection of computing resources of an organization used to perform one or more tasks involving computer processing. An example enterprise computing environment includes various computing resources distributed across a network, and may further include private and shared content on intranet web servers, databases, files on local hard discs or file servers, email systems, document management systems, portals, and so on.

Figure 2:
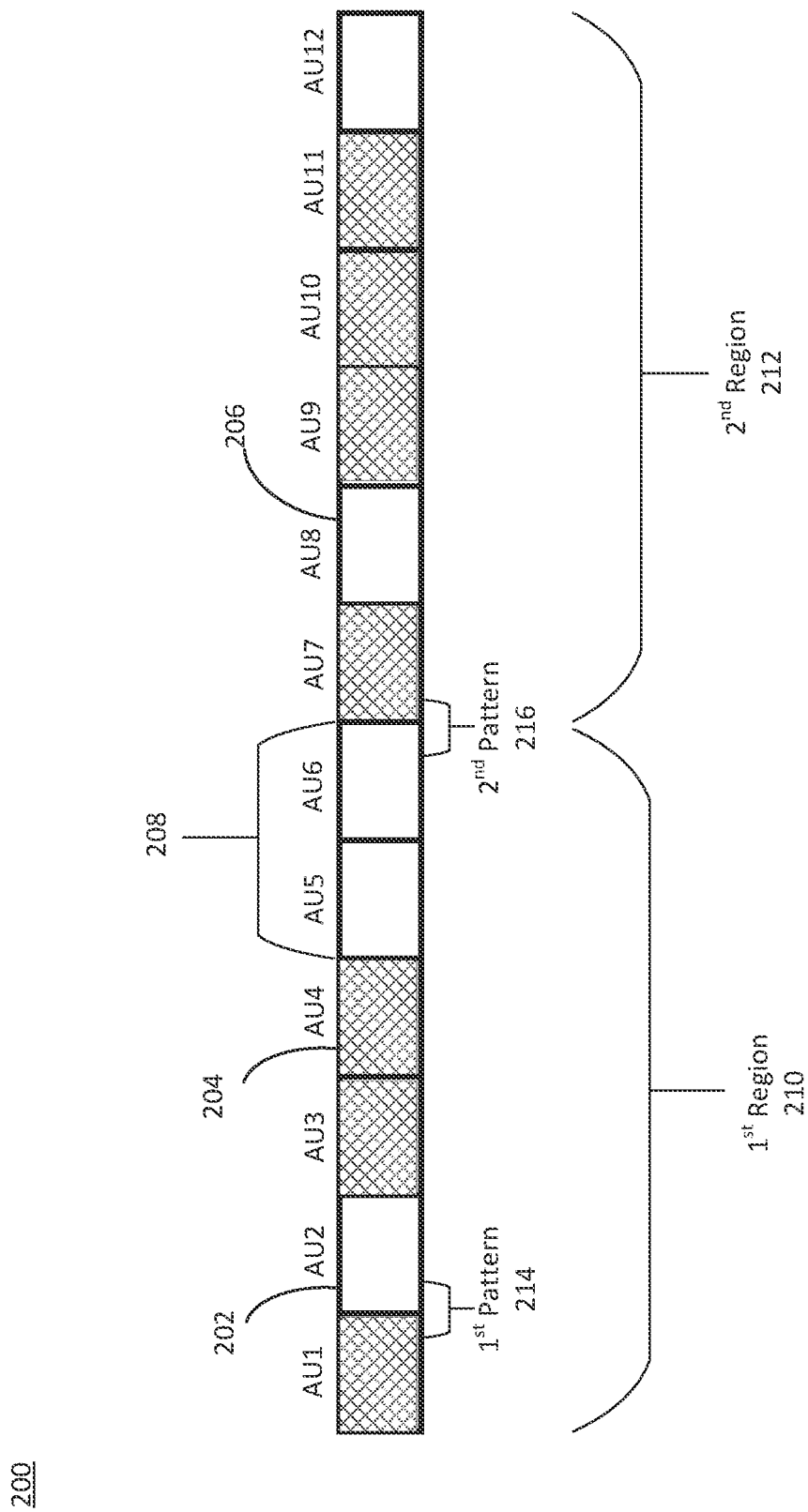
FIG. 2 is an illustration of an example of an allocation unit layout, in accordance with some implementations.

In FIG. 2, an example of an allocation unit layout ("AU layout") 200 is shown, including a plurality of allocation units ("AU's") 202. The AU's 202 include an assortment of used AU's 204 and available AU's 206. For illustration purposes, the AU layout 200 includes twelve (12) AU's (AU1 through AU12) with seven (7) used AU's 204 (AU1, AU3, AU4, AU7, AU9, AU10, and AU11) and five (5) available AU's 206 (AU2, AU5, AU6, AU8, and AU12). The layout 200 further includes an example of a hole 208 AU5 to AU6. The layout 200 is divided into two local regions 210, 212.

The layout 200 may be scanned in a direction from left at AU1 to right at AU12. Although, the layout 200 may also be scanned in a direction from right at AU12 to left at AU1. Occurrences of a first pattern 214 of a used AU 204 followed by an available AU 202 are detected. In addition, occurrences of a second pattern 116 of an available AU 202 followed by a used AU 204 are detected. The number of occurrences of the first pattern is found to be four (4) in the layout 200 and the number of the second pattern is three (3).

Regions of an AU layout each include a same number of a plurality of allocation units, such as local regions. In the example AU layout 200 in FIG. 2, two regions 210, 212 are shown, each including six (6) AU units. In some implementations, one or more regions may be scanned and assessed as independent groups, rather than scanning an entire AU layout.

Equation 1 illustrates one manner of determining the fragmentation value ($f$) to determine occurrences of holes according to the present fragmentation assessment system.

$$f = \frac{v1 + v2}{v3} \qquad \text{Equation 1}$$

In Equation 1, in the direction of scanning an AU layout, or a portion thereof, a first value ($v1$) represents a number of occurrences of a first pattern of a used allocation unit followed by an available allocation unit ("10"). A second value ($v2$) represents a number of occurrences of a second pattern of an available allocation unit followed by a used allocation unit ("01"). A hole summation value is determined of the first value representing the first pattern and the second value representing the second pattern Furthermore, a third value ($v3$) represents a total of allocation units of the allocation unit layout, or portion thereof. The fragmentation value is determined by dividing the holes summation value by the third value representing the total of allocation units.

For an example of applying Equation 1, an allocation unit layout is provided that includes used allocation units ("1") and available allocation units ("0"). Determination is made of a first value ($v1$) representing an ("10") pattern of at least a portion of the allocation unit layout and a second value ($v2$) representing an ("01") pattern of at least a portion of the allocation unit layout. Furthermore, a fragmentation value ($f$) is determined representing holes of the allocation layout based on at least one of: ($v1$) or ($v2$), and a third value ($v3$) representing a total of allocation units of at least a portion of the allocation unit layout.

The following are examples of AU layouts that may be assessed for fragmentation degree using the Equation 1 presented above:
 (a) 1100100110010000
 (b) 1110000011100000.

Equation 1 may be applied to determine the fragmentation value by scanning, for example, from left to right along the allocation unit layout. In example (a), value ($v1$) is determined as four (4), ($v2$) is determined as three (3), and ($v3$) is determined as sixteen (16). Example (a) has a fragmentation value of 0.44 (or 44% fragmented). In example (b), value ($v1$) is determined as two (2), ($v2$) is determined as one (1), and ($v3$) is determined as sixteen (16). Example (a) has a fragmentation value of 0.19 (or 19% fragmented). Thus, it is determined that example (a) has a greater degree of fragmentation than example (b).

The following additional examples depict allocation layouts having twenty (20) continuous AU's.
 (c) 11111111111111000000
 (d) 11110011110011100111
 (e) 11011011011011011011
 (f) 10101010101010101010.

Application of Equation 1, provides the following results:
For AU sequence (c), $f=1/20=0.05$ or 5% fragmentated
For AU sequence (d), $f=6/20=0.3$ or 30% fragmentated
For AU sequence (e), $f=12/20=0.6$ or 60% fragmentated
For AU sequence (f), $f=0.9$ or 90% fragmentated.

It is noted, that for some applications of Equation 1, the occurrences of "01" and "10" are equal or almost equal since either "01" and "10" accounts for the number of holes, for example that start with "10" and end with "01". As such, in some situations, Equation 1 may be simplified as:

$$f = 2 * \frac{v1}{v3} \text{ or,} \qquad \text{Equation 1a}$$

$$f = 2 * \frac{v2}{v3} \qquad \text{Equation 1b}$$

In some implementations, the AU layout may be divided into regions. In such cases, various regions may be scanned and patterns determined as described above for Equation 1. The resulting fragmentation values for various regions may be compared to determine a region to target for fragmentation correction procedures. In some implementations, the regions may be ranked according to the associated fragmentation value for the respective regions. The ranking may be used to select regions for correction procedures, such as selecting a top number or percentage of ranked regions or ranked regions above a threshold degree of fragmentation.

In some implementations, the AU layout may be stored in bookkeeping space allocation structures, such as bitmaps. In such cases, the bitmap structure may be scanned and patterns determined as described above for Equation 1. The values may be inserted into Equation 1 to determine the fragmentation presented by the bitmap as representative of the fragmentation in the AU layout.

Figure 3:
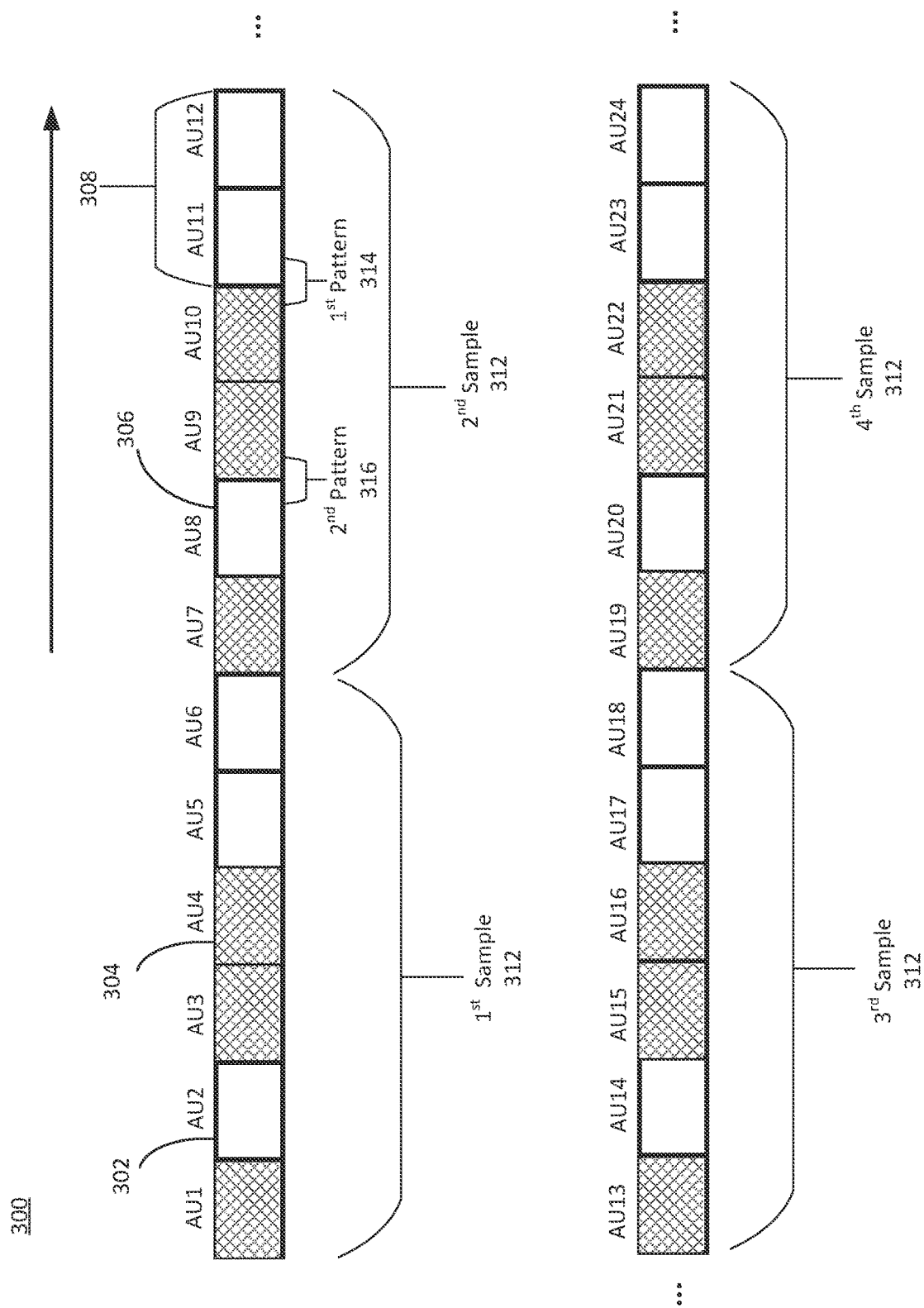
FIG. 3 is an illustration of an example of an allocation unit layout which includes samples for evaluation, in accordance with some implementations.

In some instances, assessment of samples of an AU layout or a bitmap of an AU layout may be of interest. For example, an AU layout or bitmap structure may be substantially large in size, e.g., petabytes, and scanning of the entire AU layout or bitmap structure may be excessively time and resource consuming. For illustration purposes, FIG. 3 depicts an example of a large AU layout 300 in which sampling is performed for fragmentation assessment. Sampling may include dividing the AU layout 300 or bitmap structure into equal distributions to identify samples.

As shown in FIG. 3, an AU layout 300 having a plurality of AU's 302 include used AU's 304 and available AU's 306 forming holes 308. Sampling of AU layout 300 forms a plurality of samples 312. Fragmentation may be assessed for one or more of the samples 312 by scanning the sample(s) and determining occurrences of a used/available pattern 314 and/or occurrences of an available/used pattern 316 in the direction of the scan (shown by an arrow in FIG. 3).

Equation 2 illustrates a manner of determining the fragmentation value ($f$) to determine occurrences of holes by sampling according to the present fragmentation assessment system. For sampling implementations, the fragmentation value ($f$) may be determined according to Equation 2.

$$f = \frac{v1 + v2}{(v4 + v5) + (v1 + v2)} \qquad \text{Equation 2}$$

In Equation 2, the first value (v1) represents a number of occurrences of a first pattern of a used allocation unit followed by an available allocation unit ("10"), and the second value (v2) represents a number of occurrences of a second pattern of an available allocation unit followed by a used allocation unit ("01"). A fourth value (v4) represents occurrences of at least two adjacent used allocation units ("11"). A fifth value (v5) represents occurrences of at least two adjacent available allocation units ("00"). The total of allocation units is represented by a summation of the fourth value (v4) and the fifth value (v5) with the first value (v1) and the second value (v2).

In some implementations, a bitmap structure representing the samples may be scanned and patterns determined as described above for Equation 2. The values may be inserted into Equation 2 to determine the fragmentation presented by the bitmap as representative of the samples to assess the fragmentation in the AU layout.

Figure 4:
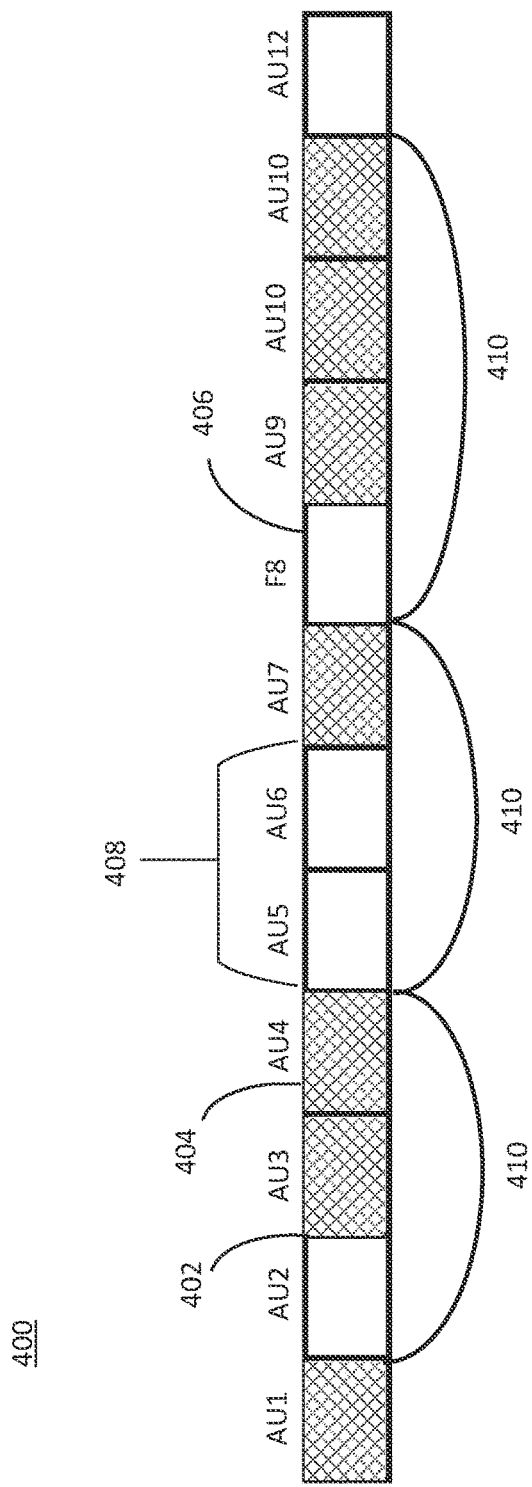
FIG. 4 is an illustration of an example of a linked list for an allocation unit layout, in accordance with some implementations.

In some implementations, other bookkeeping space allocation structures, such as linked lists (also referred to as "free lists") may include AU layout information. Linked lists may be evaluated according to the fragmentation assessment system. As shown in FIG. 4 a linked list AU layout 400 is provided having a plurality of AU's 402 that include used AU's 404 and available AU's 406. A linked list data structure is formed by multiple links 410 that point to the free AU's (or "10" patterns) in the AU layout. To determine occurrences of holes 408, the linked list may be scanned. The fragmentation value ($f$) may be calculated by applying Equation 1b (adapted from Equation 1 in simplified version shown above) in which fragmentation is normalized, as shown below.

$$f = 2 * \frac{v2}{v3} \qquad \text{Equation 1b}$$

In Equation 1b, the second value (v2) represents a number of occurrences of a second pattern of an available allocation unit followed by a used allocation unit ("01") and the third value (v3) represents a total of AU's of the AU layout.

In some implementations, it may be observed that the size of the second pattern ("01") may be nearly equal to a size of the linked list storing the AU layout information. In a variation of Equation 1b, an Equation 3 may be provided that employs a sixth value (v6) that represents a total size of the linked list. Equation 4 is shown below.

$$f = 2 * \frac{v6}{v3} \qquad \text{Equation 3}$$

Figure 5:
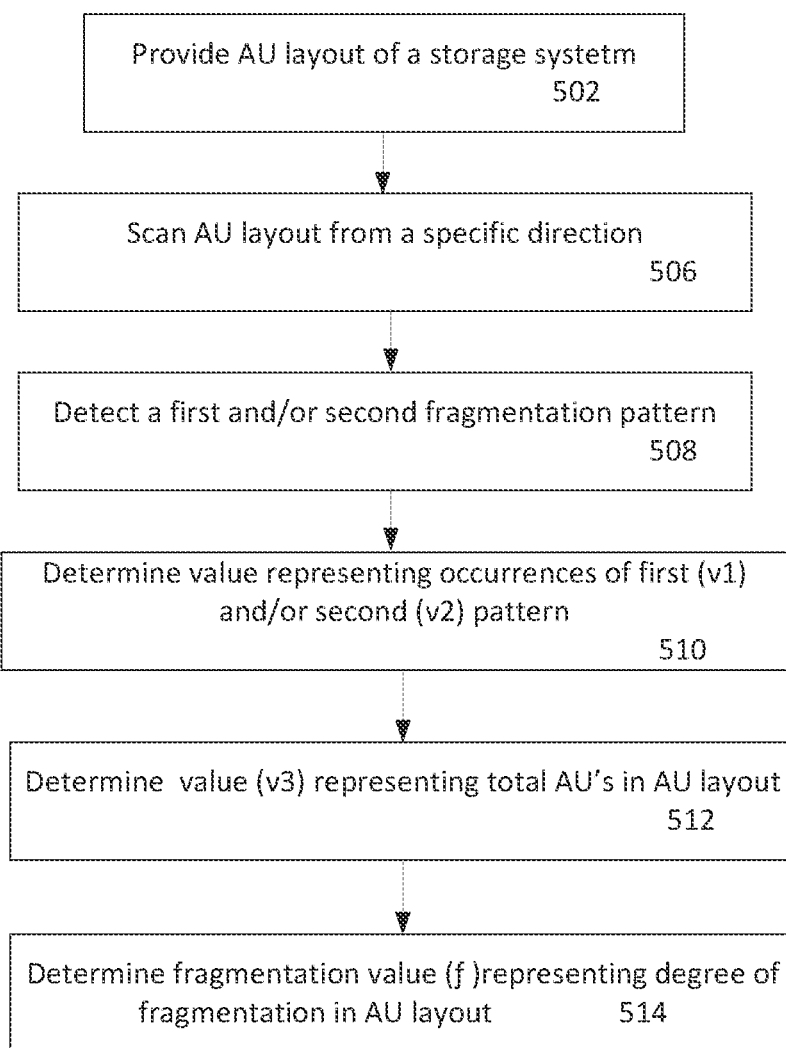
FIG. 5 is a flowchart of an example of a fragmentation measurement process, in accordance with some implementations.

FIG. 5 shows a flow chart of an example method of fragmentation measurement 600 in which an AU layout (such as 200 in FIG. 2) is evaluated to assess fragmentation of the AU layout provided in block 502. In block 504, the AU layout is scanned in a specific direction, such as from left to right or from right to left. In block 508, the method includes detecting a first pattern of a used/available AU pattern and/or the occurrences of second available/used AU pattern. In block 510, respective values are determined to represent a number of occurrences of the first pattern and/or second value. In block 512, a value of the total AU's in the AU layout is determined. In block 514, a fragmentation value is calculated to represent the degree of fragmentation in the AU layout, based on the occurrences of holes in the AU layout.

At times, the fragmentation measurement system may be applied to determine regions of an AU layout to perform fragmentation correction procedures. In such applications, the fragmentation value may be a criteria used in prioritizing various regions and/or create a prioritization sequence of regions to iteratively cure fragmentation.

Figure 6:
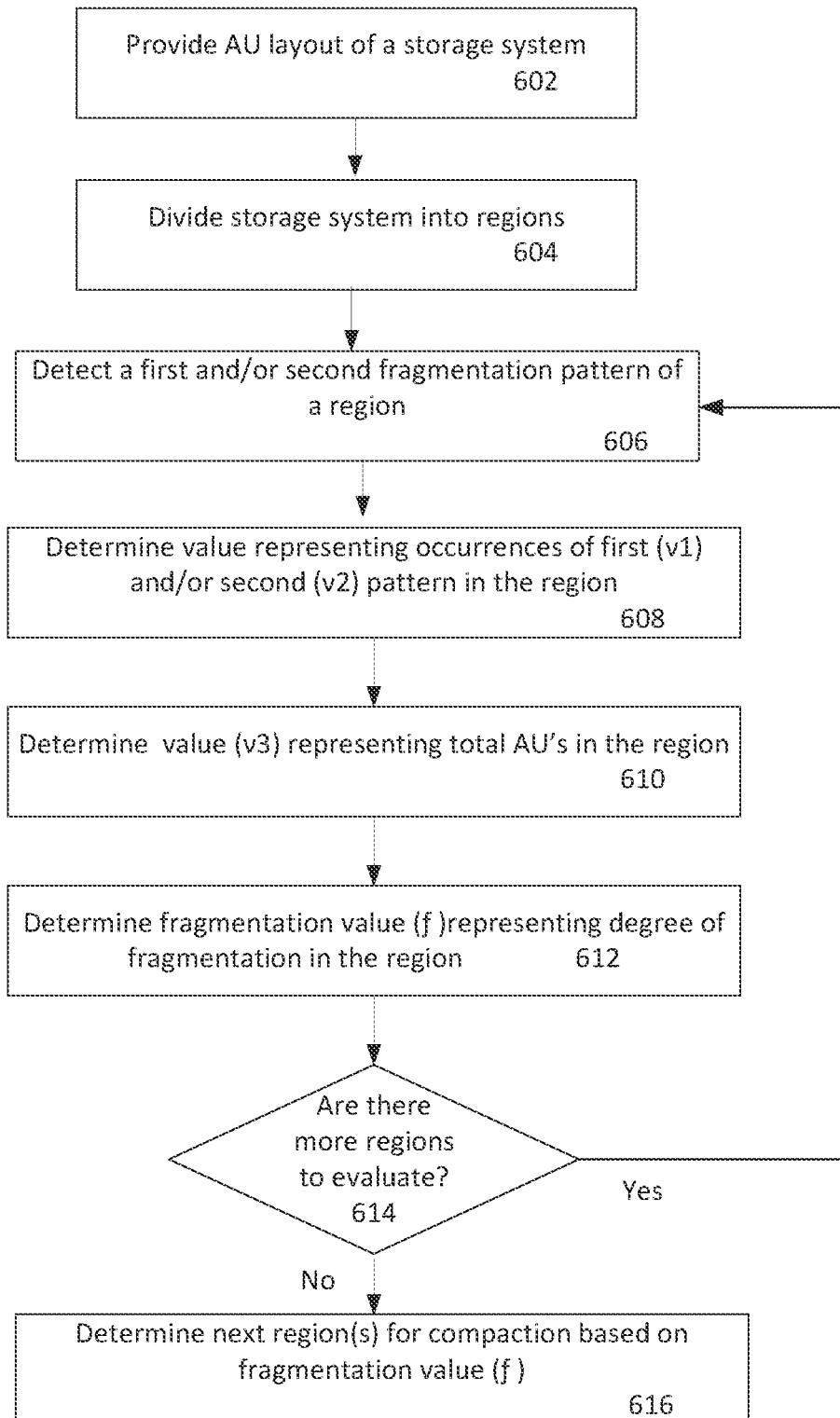
FIG. 6 is a flowchart of an example of a fragmentation measurement process applied to regions of an allocation unit layout to assess fragmentation in the regions, in accordance with some implementations.

FIG. 6 shows a flow chart of an example method of fragmentation measurement 600 in which region(s) (such as 210 and 212 in FIG. 2) of an AU layout are evaluated to assess fragmentation in the region(s). In block 602, an AU layout of a storage system is provided. For example, for programming in a particular software language, memory is needed to allocate data such as variables, objects, etc.

In block 604, storage system is divided into separate regions to individually evaluate. The size of each region is based on select portion that would provide a target performance. For example, for a 10 GB memory having a total of 1024 regions, 700 allocation unit region may be needed to store a particular body of data, e.g., application code. It may be decided that 700 AU region is too large to assess. Therefore, the memory is divided into 100 AU region sizes.

In block 606, a given region is scanned to detect a first and/or second used and free fragmentation patterns. For example, the first pattern may be used-to-free (10) allocation units in the direction of the scan. The second pattern may be free-to-used (01) allocation units in the direction of the scan.

In block 608, a value is determined to represent occurrences of first (v1) and/or second (v2) pattern in the region. In the illustrated example, in a 100 AU region, the first pattern may be found occur 10 times, for a value v1 of 10. The second pattern may be found to also occur 10 times, for a value v2 of 10.

In block 610, a third value (v3) may be determined representing the total of allocation units in the given region. In the illustrated example, the third value (v3) is 100 in the example region.

In block 612, the fragmentation value ($f$) is determined representing a degree of fragmentation in the given region, as a calculation of occurrences of holes in the region. In some implementations, the fragmentation value ($f$) may be determined as shown in Equation 1 described above, by a summation value of the first value (v1) and second value (v2), divided by the third value (v3). In the illustrated example, the fragmentation value for the given region is 5.

In decision block 614, it is decided whether there are more regions to evaluate. If there are more regions of interest to evaluate, the method returns to block 606 to detect first and/or second AU patterns in the next region. If there are no more regions of interest to evaluate, the method proceeds to block 616, in which fragmentation value's ($f$) of the evaluated regions are used as a basis, at least in part, to determine which region(s), if any, are to be compacted. In some implementations, a fragmentation value of a particular region meeting a threshold amount may trigger compaction of that region. In some implementations, garbage collection may be incremental each time the assessment is performed, to pick the top region(s), e.g., top 100 regions, according to the found fragmentation value(s). Such assessment may be performed on a regularly scheduled basis or triggered by various indicators, e.g., a threshold amount of storage used.

Figure 7:
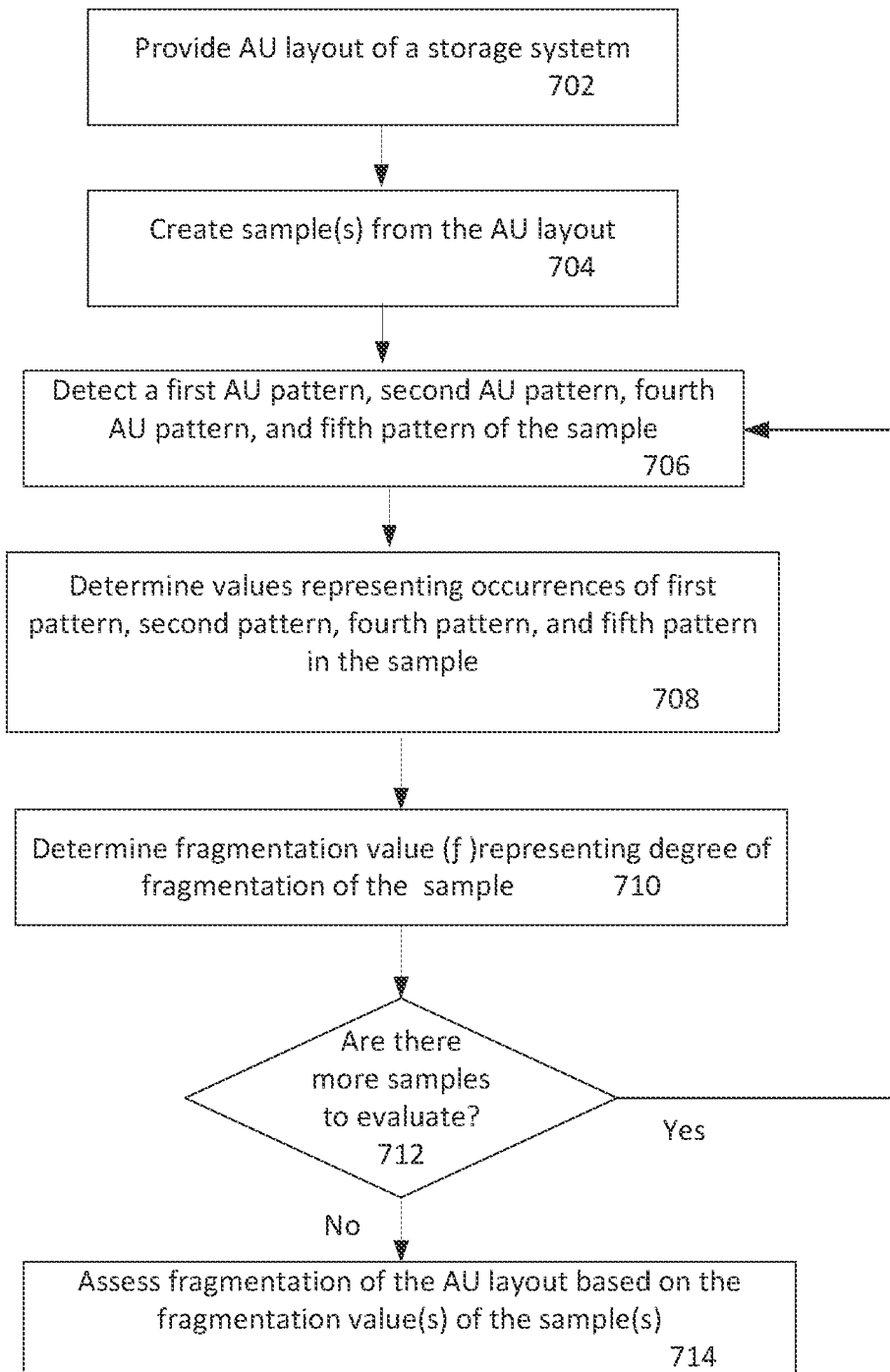
FIG. 7 is a flowchart of an example of a fragmentation measurement process applied to linked list of an allocation unit layout, in accordance with some implementations.

FIG. 7 shows a flowchart of an example of a fragmentation measurement process 700 applied to sampling of an AU layout(such as 300 in FIG. 3) provided, in block 702. In block 704 samples are taken from the AU layout. In some implementations, there may be an equal distribution of samples.

One or more samples may be scanned and evaluated. In block 706, according to the direction of the scan of the sample, used and available AU patterns are detected, including a first pattern("10") representing a used allocation unit followed by an available allocation unit, a second pattern ("01") representing a number of occurrences of a second pattern of an available allocation unit followed by a used allocation unit, a fourth pattern ("11") at least two adjacent used allocation units, and a fifth pattern ("00") representing at least two adjacent available allocation units. For simplicity of this description, "third pattern" is not used herein. In block 708, values representing occurrences of first pattern, second pattern, fourth pattern, and fifth pattern in the sample are determined.

In block 710, a fragmentation value ($f$) representing a degree of fragmentation in the sample, as calculated by the occurrences of holes in the sample is determined, such as by applying Equation 2. In decision block 712 it is decided whether there are additional samples that are to be evaluated. If there are more samples to evaluate, the method returns to block 706 to detect the AU patterns in the next sample. If there are no more samples to evaluate, the method proceeds to block 714, in which an assessment of the fragmentation of the AU layout is made based at least in part, on the fragmentation value of the sample(s). In some implementations, a survey of degrees of fragmentation in multiple samples are made and considered to assess the overall fragmentation of the AU layout. For example, an average fragmentation value of two or more samples may be used to evaluate the degree of fragmentation in the AU layout. In some implementations, only a single sample is evaluated as representing the fragmentation of the AU layout.

Figure 8:
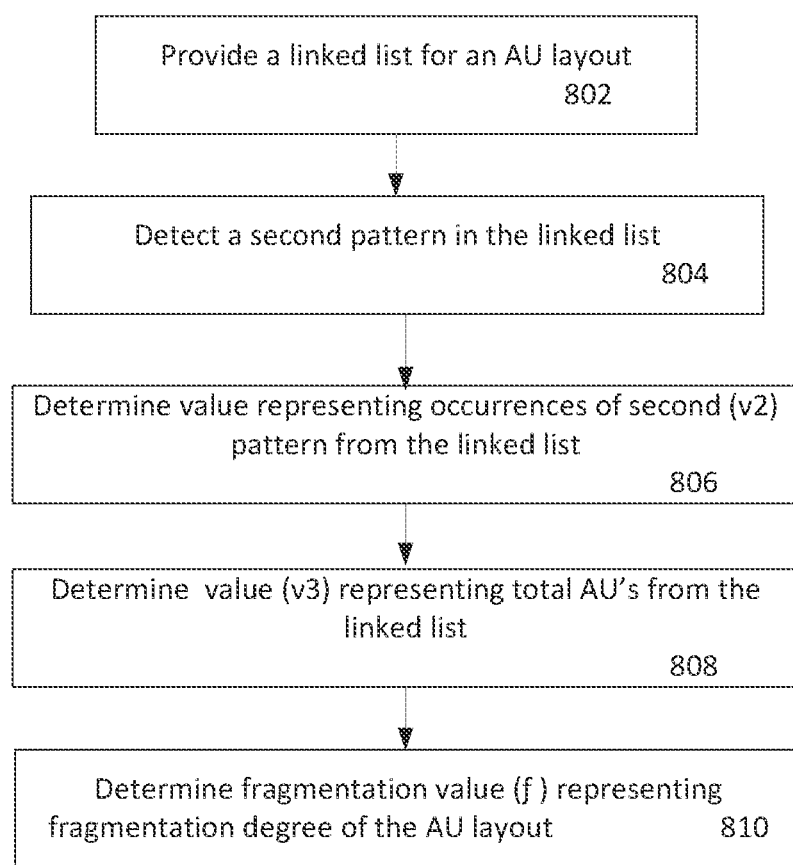
FIG. 8 is a flowchart of an example of a fragmentation measurement process applied to samples taken from an allocation unit layout, in accordance with some implementations.

FIG. 8 shows a flowchart of an example of a fragmentation measurement process 800 applied to a linked list of an AU layout (such as 400 in FIG. 4). In block 802 a linked list of an AU layout is provided. AU layout information of the linked lists may include linkages (such as 410 in FIG. 4) of available AU's in the AU layout. Various methods may be employed to create the linked list data structure to include AU layout information.

In block 804, the linked list is scanned and a second pattern of an available allocation unit followed by a used allocation unit ("01") is detected from the AU layout information in the linked list, in the direction of the scan. In block 806, a value is determined to represent the number of occurrences of the second pattern. In block 808, a third value (v3) may be determined representing the total of allocation units from the AU layout information in the linked list. In block 810, a fragmentation value ($f$) is determined, such as by applying Equation 1b, to represent a degree of fragmentation of the AU layout.

Figure 9:
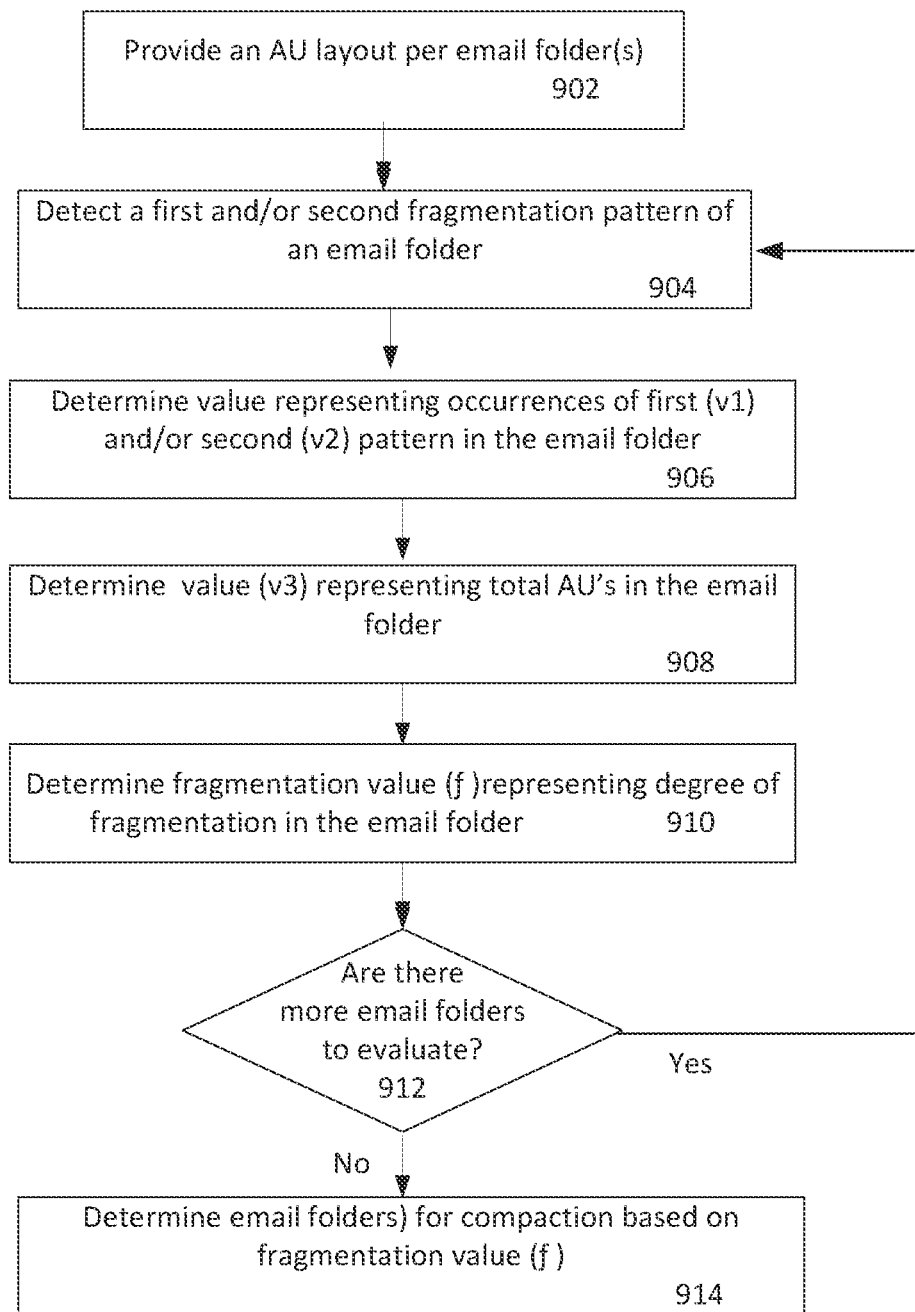
FIG. 9 is a flowchart of an example of a fragmentation measurement process applied to email compaction, in accordance with some implementations.

FIG. 9 shows a flowchart of an example of a fragmentation measurement process applied to email compaction of one or more email folders. Email folders may be compacted to free wasted space, maintain speed of performance, ensure new messages are stored, prevent loss of parts of messages, etc. In block 902, an AU layout is provided for each email folder to be assessed for fragmentation.

In block 904, a given email folder is scanned in a particular direction (e.g., left to right, up to down, or down to up) to detect a first and/or second used and free fragmentation patterns. The direction of the scan may continue along multiple sequential rows and/or columns of email storage space. For example, the first pattern may be used-to-free (10) allocation units in the direction of the scan. The second pattern may be free-to-used (01) allocation units in the direction of the scan. In block 906, a value is determined to represent occurrences of first (v1) and/or second (v2) pattern in the email folder. In block 908, a third value (v3) may be determined representing the total of allocation units in the email folder.

In block 910, the fragmentation value (f) is determined representing a degree of fragmentation, as a calculation of the occurrences of holes in the region. In some implementations, the fragmentation value (f) may be determined as shown in Equation 1 described above, by a summation value of the first value (v1) and second value (v2), divided by the third value (v3).

In decision block 912, it is decided whether there are more email folders to evaluate. If there are more remail folders of interest to evaluate, the method returns to block 904 to detect first and/or second AU patterns in the next email folder. If there are no more email folders of interest to evaluate, the method proceeds to block 914, in which fragmentation value's (f) of the evaluated email folder(s) are used as a basis, at least in part, to determine which email folder(s) are to be compacted. In some implementations, a fragmentation value meeting a threshold amount may trigger compaction. Email compaction may be incremental to pick the top email folder(s) according to the found fragmentation value(s) during each iteration. Other criteria may also be employed in the decision to compact an email folder, such as type of email folder, folder size, frequency of deleting emails, etc.

Figure 10:
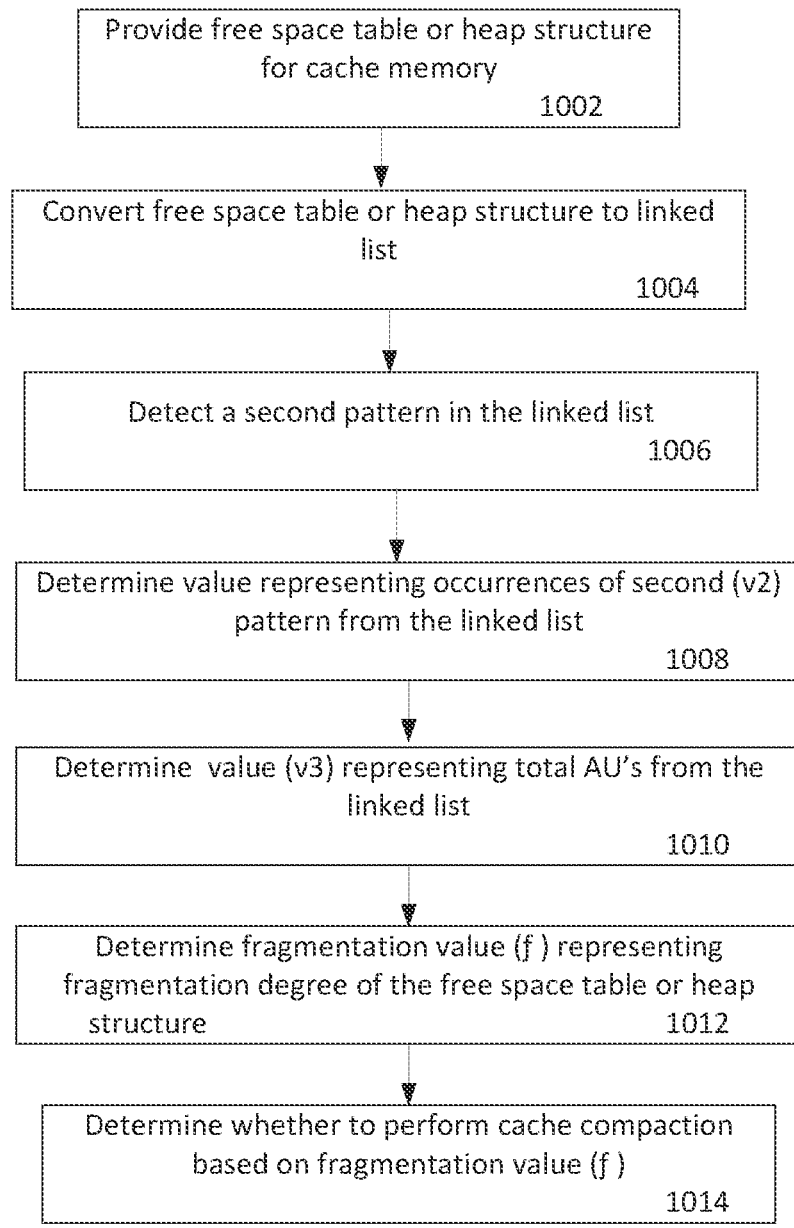
FIG. 10 is a flowchart of an example of a fragmentation measurement process applied to cache management, in accordance with some implementations.

FIG. 10 shows a flowchart of an example of a fragmentation measurement process applied to cache memory management. Cache memory may be compacted, for example, to increase cache hit ratios, increase performance times, etc. In block 1002, a free space table or a heap structure (or other such data structures representing the cache memory) is provided for the cache memory. In block 1004, the free space table or heap structure (or other data structure) is converted into a linked list.

In block 1006, the linked list is scanned to detect a second pattern of an available allocation unit followed by a used allocation unit ("01") from the AU layout information in the linked list, in the direction of the scan. In block 1008, a value is determined to represent the number of occurrences of the second pattern. In block 1010, a third value (v3) may be determined representing the total of allocation units from the AU layout information in the linked list.

In block 1012, a fragmentation value (f) is determined, such as by applying Equation 1b, to represent a degree of fragmentation of the data structure, e.g., free space table or heap structure. A determination is made, in block 1014, on whether to perform compaction of the cache memory based, at least in part, on the fragmentation value (f). In some implementations, a fragmentation value meeting a threshold amount may trigger compaction. Other metrics may be additionally considered in the decision to perform compaction, such as imposing a low time overhead, requirements of the cache, etc.

Figure 11:
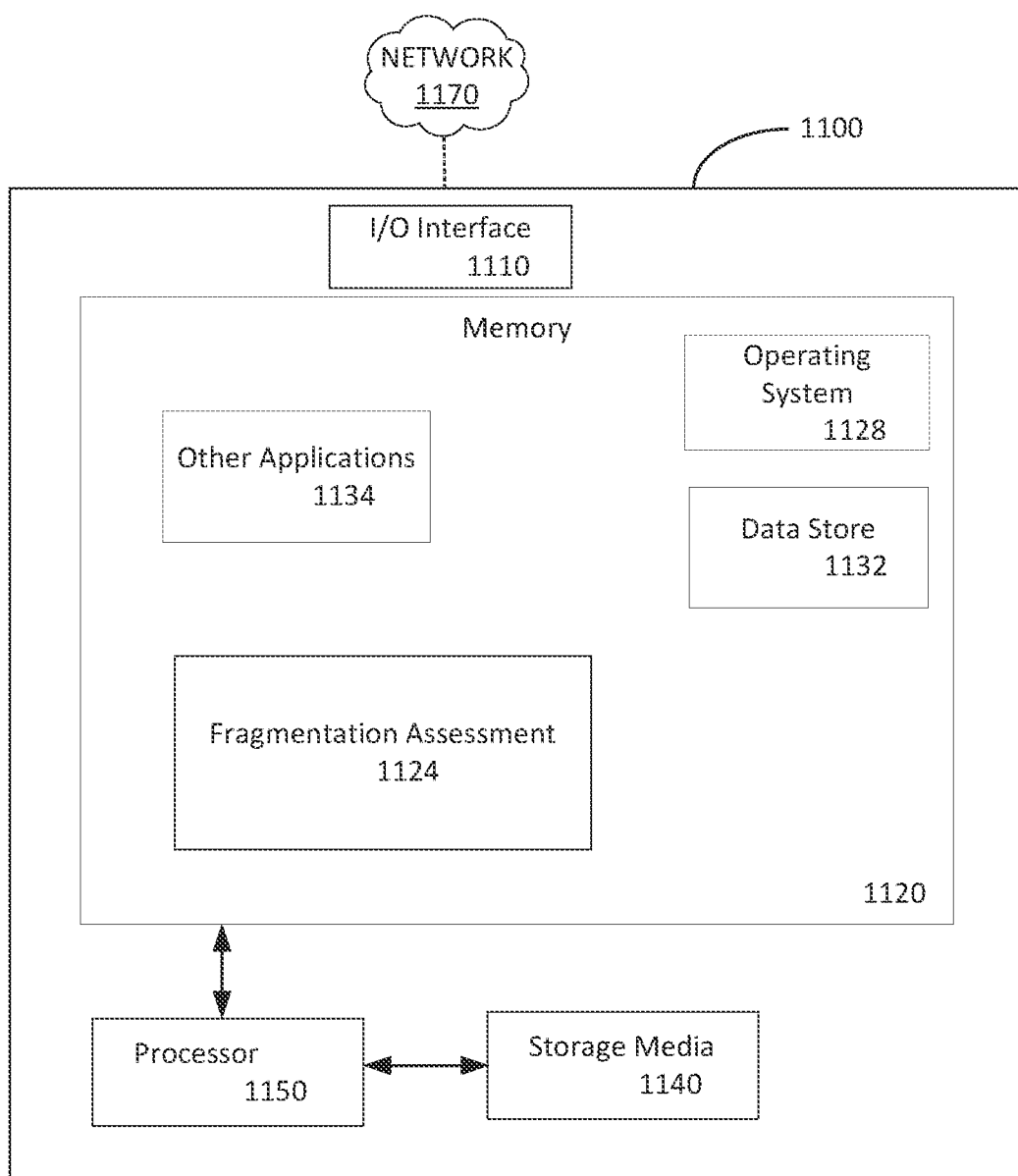
FIG. 11 a block diagram illustrating an example of a computer system upon which the fragmentation assessment system illustrated in FIG. 1 may be implemented, in accordance with some implementations.

FIG. 11 a block diagram illustrating an example computer system upon which the fragmentation assessment system illustrated in FIG. 1 may be implemented. The computer device 1100 may be a server included in the authentication system. Computer device 1100 is merely illustrative and not intended to limit the scope of the claims. One of ordinary skill in the art would recognize other variations, modifications, and alternatives.

In one exemplary implementation, computer device 1100 includes an I/O interface 1110 (which may represent a combination of a variety of communication interfaces) that may include a network interface that, e.g., receives storage assessment requests, such as via a client device or server, outputs fragmentation values to a server and/or client device(s), communicates with storage system, server, and/or client device to initiate fragmentation correction procedures on the storage system, etc. A network interface typically includes a network interface card, an Ethernet card, a modem (telephone, satellite, cable, ISDN), (asynchronous) digital subscriber line (DSL) unit, and the like. Further, a network interface may be physically integrated on a motherboard, may be a software program, such as soft DSL, or the like.

Computer device 1100 may also include software that enables communications of I/O interface 1110 over a network 1170 such as HTTP, TCP/IP, RTP/RTSP, protocols, wireless application protocol (WAP), IEEE 902.11 protocols, and the like. In addition to and/or alternatively, other communications software and transfer protocols may also be used, for example IPX, UDP or the like. Communication network 1170 may include a local area network, a wide area network, a wireless network, an Intranet, the Internet, a private network, a public network, a switched network, or any other suitable communication network, such as for example Cloud networks. Network 1170 may include many interconnected computer systems and any suitable communication links such as hardwire links, optical links, satellite or other wireless communications links such as BLUETOOTH, WIFI, wave propagation links, or any other suitable mechanisms for communication of information. For example, network 1170 may communicate to one or more mobile wireless devices 956A-N, such as mobile phones, tablets, and the like, via a base station such as a wireless transceiver.

Computer device 1100 typically includes familiar computer components such as a processor 1150, and memory storage devices, such as a memory 1120, e.g., random access memory (RAM), and storage media 1140. A bus may interconnect computer components. In some implementations, computer device 1100 is a server having hard drive(s) (e.g., SCSI) and controller card, server supported processors, network interface, memory, and the like. While a computer is shown, it will be readily apparent to one of ordinary skill in the art that many other hardware and software configurations are suitable for use with the present invention.

Memory 1120 and storage media 1140 are examples of tangible non-transitory computer readable media for storage of data, audio/video files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, cloud storage, and the like. A data store 1132 may be employed to store various on-board data.

Computer device 1100 includes one or more computer programs, such as fragmentation assessment 1124 that, when executed by one or more processors, is operable to perform various tasks of the method to assess fragmentation as described above, such as scan for AU data, detects AU patterns, determine values for occurrences of AU patterns, and/or calculate fragmentation values, as described above. The computer programs may also be referred to as programs, software, software applications or code, may also contain instructions that, when executed, perform one or more methods, such as those described herein. The computer program may be tangibly embodied in an information carrier such as computer or machine readable medium, for example, the memory 1120, storage device or memory on processor 1150. A machine readable medium is any computer program product, apparatus or device used to provide machine instructions or data to a programmable processor.

Computer device 1100 further includes an operating system 1128. Any operating system 1128, e.g., server OS, that is supports the fragmentation assessment methods may be employed, e.g., Linux, Windows Server, Mac OS, etc.

Although the description has been described with respect to particular embodiments thereof, these particular embodiments are merely illustrative, and not restrictive. For example, the degree of fragmentation determined by the fragmentation assessment processes may be applied to various other applications related to storage of data, including application not specifically described herein.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method to assess a degree of fragmentation of a storage system, the method comprising:
    providing an allocation unit layout including used allocation units and available allocation units;
    determining at least one of:
        a first value (v1) representing occurrences of a first pattern of at least a portion of the allocation unit layout, wherein the first pattern includes a used allocation unit followed by an available allocation unit; or
        a second value (v2) representing occurrences of a second pattern of at least a portion of the allocation unit layout, wherein the second pattern includes an available allocation unit followed by a used allocation unit; and
    determining a fragmentation value (f) representing occurrences of holes of the allocation unit layout based on at least one of: v1 or v2, and a third value (v3) representing a total of allocation units of at least a portion of the allocation unit layout.

2. The method of claim 1, wherein determining the fragmentation value (f) is by applying Equation 1:

$$f = \frac{v1 + v2}{v3}. \qquad \text{Equation 1}$$

3. The method of claim 2, wherein information representing the allocation unit layout is stored in a bitmap structure and determining the at least one of v1 or v2 is by scanning the bitmap structure.

4. The method of claim 2, wherein the method further includes:
    identifying regions of the allocation unit layout, wherein v1 represents the first pattern of at least one of the regions, v2 represents the second pattern of the at least one of the regions, and v3 represents a total of allocation units of the at least one of the regions.

5. The method of claim 1, further including:
    identifying a sample of the allocation unit layout, wherein v1 represents the first pattern of the sample, and v2 represents the second pattern of the sample; and determining v3 by:
  determining a fourth value (v4) representing occurrences of a fourth pattern of sample, wherein the fourth pattern includes at least two adjacent used allocation units; and
  determining a fifth value (v5) representing occurrences of a fifth pattern of the sample, wherein the fifth pattern includes at least two adjacent available allocation units,
wherein determining the fragmentation value (f) is by applying an Equation 2:

$$f = \frac{v1 + v2}{(v4 + v5) + (v1 + v2)}. \qquad \text{Equation 2}$$

6. The method of claim 1, wherein information representing the allocation unit layout is stored in a linked list structure and wherein determining the fragmentation value (f) is by using an Equation 1b:

$$f = 2 * \frac{v2}{v3}. \qquad \text{Equation 1b}$$

7. The method of claim 6, wherein v3 is equivalent to a sixth value (v6) representing a total of allocation units of the linked list structure.

8. The method of claim 1, wherein the fragmentation value (f) is used in at least one storage application or memory application including: file systems, memory management, cloud block storage defragmentation, cache mechanisms, or email compaction.

9. An apparatus to assess a degree of fragmentation of a storage system, the apparatus comprising:
  one or more processors; and
  logic encoded in one or more non-transitory media for execution by the one or more processors and when executed operable to:
  provide an allocation unit layout including used allocation units and available allocation units;
  determine at least one of:
  a first value (v1) representing occurrences of a first pattern of at least a portion of the allocation unit layout, wherein the first pattern includes a used allocation unit followed by an available allocation unit; or
  a second value (v2) representing occurrences of a second pattern of at least a portion of the allocation unit layout, wherein the second pattern includes an available allocation unit followed by a used allocation unit; and
  determine a fragmentation value (f) representing occurrences of holes of the allocation unit layout based on at least one of: v1 or v2, and a third value (v3) representing a total of allocation units of at least a portion of the allocation unit layout.

10. The apparatus of claim 9, wherein determining the fragmentation value (f) is by applying Equation 1:

$$f = \frac{v1 + v2}{v3}. \qquad \text{Equation 1}$$

11. The apparatus of claim 10, wherein information representing the allocation unit layout is stored in a bitmap structure and determining the at least one of v1 or v2 is by scanning the bitmap structure.

12. The apparatus of claim 10, wherein the logic when executed is further operable to:
  identify regions of the allocation unit layout, wherein v1 represents the first pattern of the regions, v2 represents the second pattern of the at least one of the regions, and v3 represents a total of allocation units of the at least one of the regions.

13. The apparatus of claim 9, wherein the logic when executed is further operable to:
  identify a sample of the allocation unit layout, wherein v1 represents the first pattern of the sample, and v2 represents the second pattern of the sample; and
  determine v3 by:
    determining a fourth value (v4) representing occurrences of a fourth pattern of sample, wherein the fourth pattern includes at least two adjacent used allocation units; and
    determining a fifth value (v5) representing occurrences of a fifth pattern of the sample, wherein the fifth pattern includes at least two adjacent available allocation units,
  wherein determining the fragmentation value (f) is by applying an Equation 2:

$$f = \frac{v1 + v2}{(v4 + v5) + (v1 + v2)}. \qquad \text{Equation 2}$$

14. The apparatus of claim 9, wherein information representing the allocation unit layout is stored in a linked list structure and wherein determining the fragmentation value (f) is by using an Equation 1b:

$$f = 2 * \frac{v2}{v3}. \qquad \text{Equation 1b}$$

15. A non-transitory computer-readable storage medium carrying program instructions to assess a degree of fragmentation of a storage system, and for execution by the one or more processors and when executed operable to:
  provide an allocation unit layout including used allocation units and available allocation units;
  determine at least one of:
    a first value (v1) representing occurrences of a first pattern of at least a portion of the allocation unit layout, wherein the first pattern includes a used allocation unit followed by an available allocation unit; or
    a second value (v2) representing occurrences of a second pattern of at least a portion of the allocation unit layout, wherein the second pattern includes an available allocation unit followed by a used allocation unit; and
  determine a fragmentation value (f) representing occurrences of holes of the allocation unit layout based on at least one of: v1 or v2, and a third value (v3) representing a total of allocation units of at least a portion of the allocation unit layout.

16. The non-transitory computer-readable storage medium of claim 15, wherein determining the fragmentation value (f) is by applying Equation 1:

$$f = \frac{v1 + v2}{v3}. \qquad \text{Equation 1}$$

17. The non-transitory computer-readable storage medium of claim 16, wherein information representing the allocation unit layout is stored in a bitmap structure and determining the at least one of v1 or v2 is by scanning the bitmap structure.

18. The non-transitory computer-readable storage medium of claim 16, wherein the logic when executed is further operable to:
- identify regions of the allocation unit layout, wherein v1 represents the first pattern of the regions, v2 represents the second pattern of the at least one of the regions, and v3 represents a total of allocation units of the at least one of the regions.

19. The non-transitory computer-readable storage medium of claim 15, wherein the logic when executed is further operable to:
- identify a sample of the allocation unit layout, wherein v1 represents the first pattern of the sample, and v2 represents the second pattern of the sample; and
- determine v3 by:
  - determining a fourth value (v4) representing occurrences of a fourth pattern of sample, wherein the fourth pattern includes at least two adjacent used allocation units; and
  - determining a fifth value (v5) representing occurrences a fifth pattern of the sample, wherein the fifth pattern includes at least two adjacent available allocation units, wherein determining the fragmentation value $f$) is by applying an Equation 2:

$$f = \frac{v1 + v2}{(v4 + v5) + (v1 + v2)}.$$  Equation 2

20. The non-transitory computer-readable storage medium of claim 15, wherein information representing the allocation unit layout is stored in a linked list structure and wherein determining the fragmentation value ($f$) is by using an Equation 1b:

$$f = 2 * \frac{v2}{v3}.$$  Equation 1b

* * * * *

UNITED STATES PATENT AND TRADEMARK OFFICE
CERTIFICATE OF CORRECTION

PATENT NO. : 11,556,256 B2
APPLICATION NO. : 17/231934
DATED : January 17, 2023
INVENTOR(S) : Mao et al.

Page 1 of 1

It is certified that error appears in the above-identified patent and that said Letters Patent is hereby corrected as shown below:

In the Drawings

On sheet 5 of 11, in FIG. 5, under Reference Numeral 502, Line 1, delete "systetm" and insert -- system --, therefor.

On sheet 7 of 11, in FIG. 7, under Reference Numeral 702, Line 1, delete "systetm" and insert -- system --, therefor.

On sheet 9 of 11, in FIG. 9, under Reference Numeral 914, Line 1, delete "folders)" and insert -- folders --, therefor.

In the Specification

In Column 2, Line 23, delete "occurrences a" and insert -- occurrences of a --, therefor.

In Column 3, Line 19, delete "FIG. 8" and insert -- FIG. 7 --, therefor.

In Column 3, Line 23, delete "FIG. 7" and insert -- FIG. 8 --, therefor.

In the Claims

In Column 17, Line 61, in Claim 10, after "$f = \dfrac{v1 + v2}{v3}$" insert -- . --, therefor.

In Column 20, Lines 1-2, in Claim 19, delete "occurrences a" and insert -- occurrences of a --, therefor.

In Column 20, Line 5, in Claim 19, delete "f)" and insert -- f --, therefor.

Signed and Sealed this
Tenth Day of October, 2023

*Katherine Kelly Vidal*
Katherine Kelly Vidal
*Director of the United States Patent and Trademark Office*